United States Patent [19]
Gryglas

[11] 3,865,216
[45] Feb. 11, 1975

[54] CONTINUOUS ROTARY DAMPER

[75] Inventor: Bogdan R. Gryglas, Woodridge, Ill.

[73] Assignee: Efdyn Corporation, Chicago, Ill.

[22] Filed: Oct. 3, 1973

[21] Appl. No.: 402,980

[52] U.S. Cl.............................. 188/290, 192/58 A
[51] Int. Cl........................................... F16d 57/02
[58] Field of Search............... 188/290, 296, 264 E; 192/58 A, 58 B, 58 C, 58 R; 73/134

[56] References Cited
UNITED STATES PATENTS

| | | | |
|---|---|---|---|
| 464,949 | 12/1891 | Alden | 192/58 B |
| 1,830,564 | 11/1931 | Rudquist | 192/58 A |
| 3,211,396 | 10/1965 | McQuillen | 188/290 X |
| 3,262,527 | 7/1966 | Allaben, Jr. | 192/58 B |

FOREIGN PATENTS OR APPLICATIONS

| | | | |
|---|---|---|---|
| 656,105 | 8/1951 | Great Britain | 73/134 |
| 724,846 | 2/1955 | Great Britain | 188/290 |

*Primary Examiner*—George E. A. Halvosa
*Attorney, Agent, or Firm*—Johnson, Dienner, Emrich & Wagner

[57] ABSTRACT

An annular stator unit is engaged in an annular stationary housing unit. A rotor unit has a hub portion journaled in the housing unit, and a radial vane portion projecting into the stator unit. A viscous fluid substantially fills the space within the housing unit for retarding rotation of the rotor unit.

7 Claims, 4 Drawing Figures

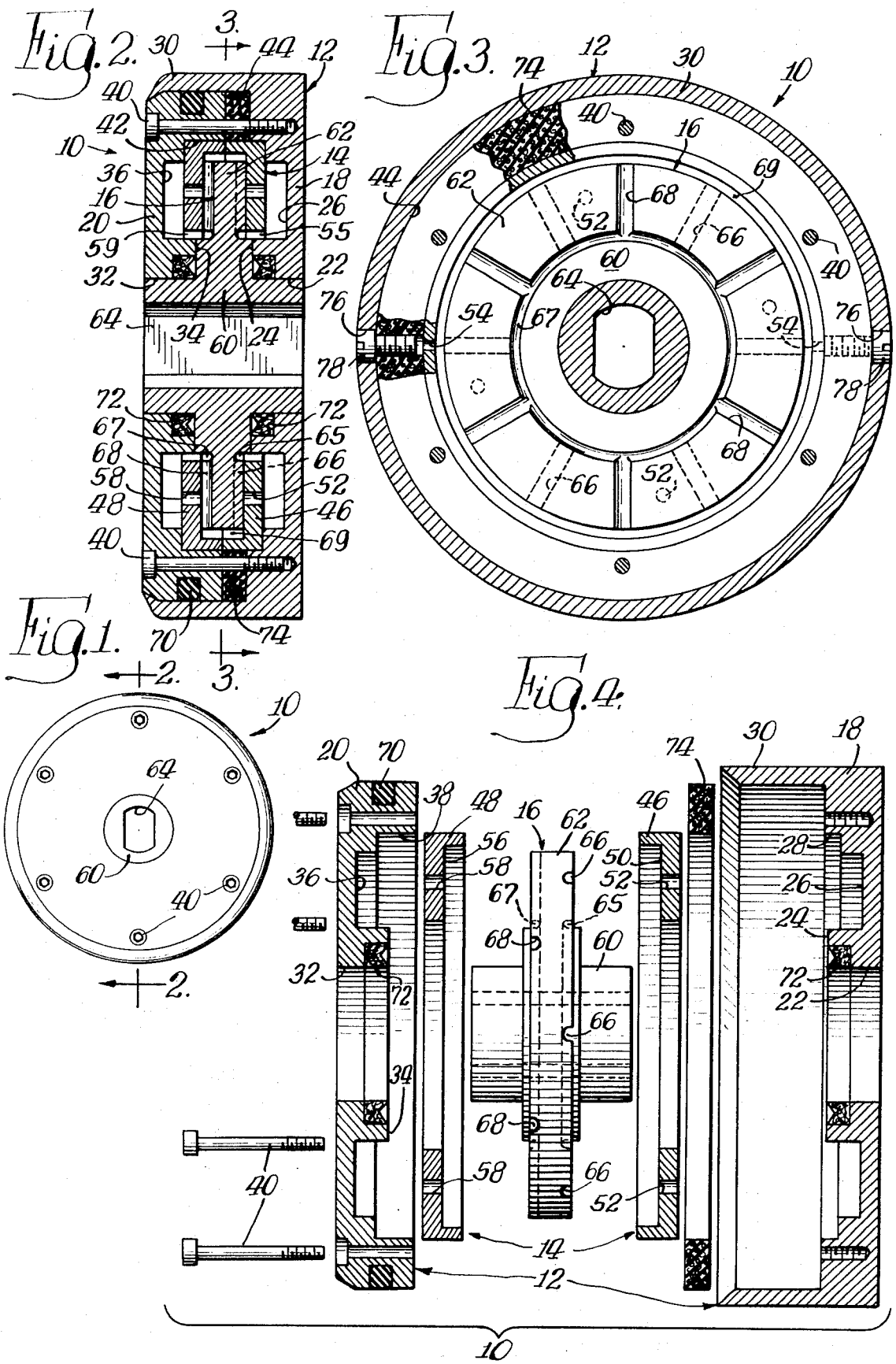

ial notch 38 radially outwardly of the cavity 36. The second housing section 20 is secured to the first housing section 18 within the flange portion 30 by means of a plurality of circumferentially spaced screws 40. With the first and second housing sections 18 and 20 in assembled relation, the annular notches 28 and 38 together define a radially inwardly facing annular recess 42 radially outwardly of the annular cavities 26 and 36; and the stator unit 14, which has seating engagement in the annular recess 42, axially spaces the first and second housing sections 18 and 20 whereby to define a radially inwardly facing annular channel 44 radially outwardly of the annular recess 42.

CONTINUOUS ROTARY DAMPER

FIELD OF THE INVENTION

The present invention relates to generally to continuous rotary dampers and more specifically to a continuous rotary damper which provides smooth, silent damping with constant torque at a constant speed.

SUMMARY OF THE INVENTION

The continuous rotary damper of the present invention comprises an annular housing unit, an annular stator unit and a rotor unit.

The housing unit has a pair of opposed axially inwardly facing annular cavities, and a radially inwardly facing annular recess. The stator unit is seated in the annular recess, and has axial ports communicating with the annular cavities. The rotor unit has a radial vane portion which projects into the stator unit and which is provided with radial slots in the opposite sides thereof. The space within the housing unit is substantially filled with a fluid for retarding rotation of the rotor unit.

The damper is comprised of few components whereby to minimize costs of manufacture and assembly. The housing unit and the stator unit are each fabricated of two parts whereby to accommodate ease of assembly. The hub of the rotor unit is journaled in the housing unit whereby dynamic stability is achieved. The housing unit also has a radially inwardly facing annular channel in which is seated fluid accumulator means for optimum damping effect.

BRIEF DESCRIPTION OF THE DRAWING

FIG. 1 is an elevational view of a continuous rotary damper embodying the principles of the present invention;

FIG. 2 is a vertical sectional view taken substantially along the line 2—2 in FIG. 1 looking in the direction indicated by the arrows;

FIG. 3 is a vertical sectional view taken substantially along the line 3—3 in FIG. 2 in FIG. 2 looking in the direction indicated by the arrows; and FIG. 4 is an exploded view corresponding generally to FIG. 2.

DESCRIPTION OF THE PREFERRED EMBODIMENT

Referring now to the drawing, there is indicated generally by the reference numeral 10 a continuous rotary damper embodying the principles of the present invention.

The damper 10 comprises an annular housing unit 12, an annular stator unit 14 and a rotor unit 16.

The housing unit 12 is of generally U-shaped configuration in cross section, and is comprised of a first housing section 18 and a second housing section 20. The first housing section 18 has a central annular axial bearing surface 22, an axially inwardly facing annular radial bearing surface 24 adjacent the axial bearing surface 22, an axially inwardly facing annular cavity 26 radially outwardly of the bearing surfaces 22 and 24, an annular notch 28 radially outwardly of the cavity 26, and an axially directed outer annular flange portion 30. The second housing section 20 has a central annular axial bearing surface 32, an axially inwardly facing annular radial bearing surface 34 adjacent the axial bearing surface 32, an axially inwardly facing annular cavity 36 radially outwardly of the bearing surfaces 32 and 34, and an an- The stator unit 14 is of generally U-shaped configuration in cross section, and is comprised of two stator sections 46 and 48 each of generally L-shaped configuration in cross section. The stator section 46 has an axially inwardly facing radial surface 50, four circumferentially spaced axial ports 52 communicating with the annular cavity 26, and a pair of diametrical opposed radial apertures 54 communicating with the annular channel 44. An annular passageway 55 also communicating with the annular cavity 26 is defined by a clearance provided between the annular inner edge of the stator section 46 and the adjacent portion of the housing section 18. The stator section 48 has an axially inwardly facing radial surface 56, and four circumferentially spaced axial ports 58 communicating with the annular cavity 36. An annular passageway 59 also communicating with the annular cavity 36 is defined by a clearance provided between the annular inner edge of the stator section 48 and the adjacent portion of the housing section 20.

The rotor unit 16 has a hub portion 60 journaled by the axial bearing surfaces 22 and 32 and the radial bearing surfaces 24 and 34 of the housing unit 12, and has a radial vane portion 62 with radial sides located in very close proximity to the radial surfaces 50 and 56 of the stator unit 14. Formed axially through the hub portion 60 is a shaft-receiving opening 64. Also, an annular groove 65 and a set of connecting radial slots 66 are formed in one side of the vane portion 62; and an annular groove 67 and a set of connecting radial slots 68 are formed in the other side of the vane portion 62. The annular grooves 65 and 67 open to the annular passageways 55 and 59 respectively. The one set of radial slots 66 is circumferentially displaced from the other set of radial slots 68. An annular passageway 69, which places the rotor slots 66 and 68 in communication, is defined by a clearance provided between the annular outer edge of the vane portion 62 and the adjacent portion of the stator unit 14.

A fluid seal ring 70 is located between the second housing section 20 and the flange portion 30 of the first housing section 18, and a pair of rotary fluid seal rings 72 are located between the first and second housing sections 18 and 20 and the hub portion 60 of the rotor unit 16. Seated in the annular channel 44, which serves as a fluid reservoir area, is a cellular fluid accumulator 74 of rubber or the like. The space within the housing unit 12 is substantially filled with a viscous fluid damping medium such as silicone fluid having a viscosity in the range, for example, of 30 to 60 centipoise. Viscous fluid is introduced into the damper 10 through one of the two housing openings 76 while vacuum is applied to the other opening 76. The housing openings 76 are normally closed by seal screws 78.

Operationally, the rotor unit 16 rotates with a shaft extending through the hub opening 64, while the housing and stator units 12 and 14 are held stationary. The viscous fluid within the housing unit 12 resists or retards rotation of the rotor unit 16 relative to the stator unit 14. The precise mode of damping is not presently known. Certainly, some, if not all, of the damping effect is the result of friction arising between the rotor unit 16 and the viscous fluid. Probably, some of the damping effect is the result of shearing of the viscous fluid by the radial rotor slots 66 and 68 at the stator ports 52 and 58. Possibly some of the damping effect may be the result of a limited pumping or throttling action arising from circulation of the viscous fluid about the stator and rotor units 14 and 16, and into and out of the accumulator 74. In any event, the rotary damper 10 provides smooth, silent damping with constant torque at a constant speed.

While there has been shown and described a preferred embodiment of the present invention, it will be understood by those skilled in the art that various rearrangements and modifications may be made therein without departing from the spirit and scope of the invention.

The invention claimed is:

1. A continuous rotary damper comprising: an annular stationary housing unit having a generally U-shaped configuration in cross section, a pair of spaced central annular axial bearing surfaces, a pair of opposed axially inwardly facing annular radial bearing surfaces respecstively adjacent said axial bearing surfaces, a pair of opposed axially inwardly facing annular cavities radially outwardly of said bearing surfaces, and a radially inwardly facing annular recess radially outwardly of said annular cavities; an annular stator unit having a generally U-shaped configuration in cross section, a pair of opposed axially inwardly facing annular radial surfaces in parallel planes, seating engagement in said annular recess, and axial ports communicating with said annular cavities; a rotor unit having a hub portion journaled by said axial and radial bearing surfaces, a radial vane portion with annular radial sides in parallel planes located in close proximity to said radial surfaces of said stator unit, and two sets of radial slots of uniform cross section respectively formed in the opposite sides of said vane portion; the inner edges of said stator unit being spaced from the adjacent portions of said housing unit whereby to define passageway means placing the radially inner ends of said radial slots in communication with said pair of annular cavities; the outer edge of said radial vane being spaced from the adjacent portion of said stator unit whereby to define passageway means placing the radially outer ends of said radial slots in communication; and a fluid substantially filling the space within said housing unit and confined therein for retarding rotation of said rotor unit.

2. The continuous rotary damper of claim 1 wherein one set of said radial slots is circumferentially displaced from the other set of said radial slots.

3. The continuous rotary damper of claim 1 wherein said housing unit is comprised of a first housing section having an axially directed outer annular flange portion, and a second housing section secured to said first housing section within said flange portion; and wherein said stator unit is comprised of two stator sections each having a generally L-shaped configuration in cross section.

4. The continuous rotary damper of claim 3 including seal means between said second housing section and said flange portion of said first housing section, and rotary seal means between said first and second housing sections and said hub portion of said rotor unit.

5. The continuous rotary damper of claim 3 wherein said stator unit axially spaces said first and second housing sections whereby to define a radially inwardly facing annular channel radially outwardly of said annular recess, wherein said annular stator unit has radial apertures communicating with said annular channel, and including fluid accumulator means seated in said annular channel.

6. The continuous rotary damper of claim 1 wherein said housing unit has a radially inwardly facing annular channel radially outwardly of said annular recess, wherein said annular stator unit has radial apertures communicating with said annular channel, and including field accumulator means seated in said annular channel.

7. A continuous rotary damper comprising: an annular stationary housing unit having a generally U-shaped configuration in cross section, a pair of opposed axially inwardly facing annular radial surfaces in parallel planes, seating engagement in said annular recess, axial ports communicating with said annular cavities, and radial apertures communicating with said annular channel; a rotor unit having a hub portion journaled in said housing unit, a radial vane portion with annular radial sides in parallel planes located in close proximity to said radial surfaces of said stator unit, and radial slots of uniform cross-section formed in the opposite sides of said vane portion; passageway means placing the radially inner ends of said radial slots in communication with said pair of annular cavities; passageway means placing the radially outer ends of said radial slots in communication; fluid accumulator means seated in said annular channel; and a fluid substantially filling the space within said housing unit for retarding rotation of said rotor unit.

* * * * *

UNITED STATES PATENT OFFICE
CERTIFICATE OF CORRECTION

PATENT NO. : 3,865,216
DATED : February 11, 1975
INVENTOR(S) : Bogdan R. Gryglas It is certified that error appears in the above-identified patent and that said Letters Patent are hereby corrected as shown below:

Col. 4, line 31    change "field" to --fluid--;

line 35    after the comma "," insert the following --a pair of opposed axially inwardly facing annular cavities, a radially inwardly facing annular recess, and a radially inwardly facing annular channel; an annular stator unit having a generally U-shaped configuration in cross section,--

Signed and sealed this 6th day of May 1975.

(SEAL)
Attest:

RUTH C. MASON
Attesting Officer

C. MARSHALL DANN
Commissioner of Patents
and Trademarks